United States Patent
Kogure et al.

3,936,815
Feb. 3, 1976

[54] APPARATUS AND METHOD FOR WRITING STORABLE IMAGES INTO A MATRIX-ADDRESSED IMAGE-STORING LIQUID CRYSTAL DISPLAY DEVICE

[75] Inventors: Osamu Kogure, Mito; Hisao Takada, Tokyo; Yoshinori Kato; Masao Kawachi, both of Mito, all of Japan

[73] Assignee: Nippon Telegraph and Telephone Public Corporation, Tokyo, Japan

[22] Filed: July 29, 1974

[21] Appl. No.: 492,421

[30] Foreign Application Priority Data
Aug. 6, 1973  Japan.................................. 48-87580
Sept. 7, 1973  Japan............................. 48-100365
Mar. 8, 1974  Japan................................ 49-26205
June 11, 1974  Japan............................... 49-65623

[52] U.S. Cl....................... 340/324 M; 350/160 LC
[51] Int. Cl.²............................................. G02F 1/18
[58] Field of Search................. 340/324 M, 173 CH; 350/160 LC

[56] References Cited
UNITED STATES PATENTS

| | | |
|---|---|---|
| 3,650,603 | 3/1972 | Heilmeier et al............. 350/160 LC |
| 3,652,148 | 3/1972 | Wysocki et al............... 350/160 LC |
| 3,776,615 | 12/1973 | Tsokamoto et al........... 350/160 LC |
| 3,790,251 | 2/1974 | Wysocki et al............... 350/160 LC |

*Primary Examiner*—Marshall M. Curtis
*Attorney, Agent, or Firm*—Wolfe, Hubbard, Leydig, Voit & Osann, Ltd.

[57] ABSTRACT

A matrix-addressed liquid crystal display device including a matrix-addressed display section is provided. The display section comprises a pair of optically transparent plates each of which having on one surface a plurality of parallel strip electrodes optically transparent and deposited through an optically transparent spacer, said pair of plates being parallelly arranged so that the electrodes will be inside and mutually intersect at right angles so as to form row and column electrode groups of a matrix, and a cholesteric phase liquid crystal filled between the respective plates, which liquid crystal being such that when a voltage applied to the electrodes is above a threshold level the molecular axes of the liquid crystal are aligned in the direction of electric field due to the voltage applied. The device utilized a nematic phase to cholesteric phase transition of the liquid crystal occurring when the voltage applied is maintained nearby the threshold level and becomes for a short time period below the threshold level.

7 Claims, 26 Drawing Figures

APPARATUS AND METHOD FOR WRITING STORABLE IMAGES INTO A MATRIX-ADDRESSED IMAGE-STORING LIQUID CRYSTAL DISPLAY DEVICE

This invention relates to matrix-addressed liquid crystal display devices.

Liquid crystals are classified into such three kinds as nematic, cholesteric and smectic materials according to the molecular arrangement. Further, in the nematic material in its normal state, all the molecules are arranged in parallel with each other in their longitudinal axial direction. The nematic materials are further divided into an n-type nematic material in which the direction of the electric dipole moment is perpendicular or nearly perpendicular to the molecular longitudinal axis, and a p-type nematic material in which the direction of the electric dipole moment is parallel or nearly parallel with the molecular longitudinal axis. The cholesteric liquid crystal takes such molecular structure that, in the normal state, very thin layers parallel with each other and containing molecules arranged in parallel with one another in their longitudinal axial directions are formed, and the axial directions of the molecules vary by a fixed angle layer by layer. Therefore, the axial directions of the molecules in each layer are relatively rotating at a fixed pitch. This is called a helicoidal arrangement. The cholesteric phase mixed liquid crystal referred to in the present invention is a mixed liquid crystal in which such helicoidal arrangement is predominant of all.

Figure 1A:
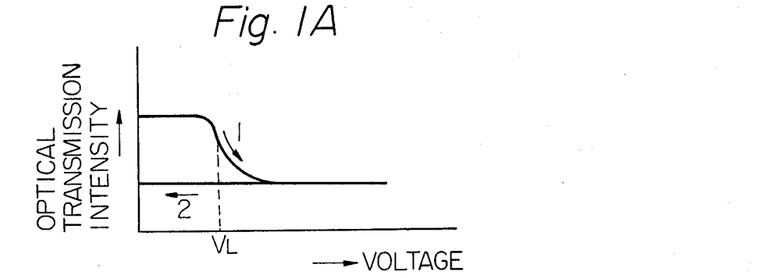
FIGS. 1A through 1C are diagrams showing relations between applied voltage and optical transmission intensity of liquid crystals.
Figure 1B:
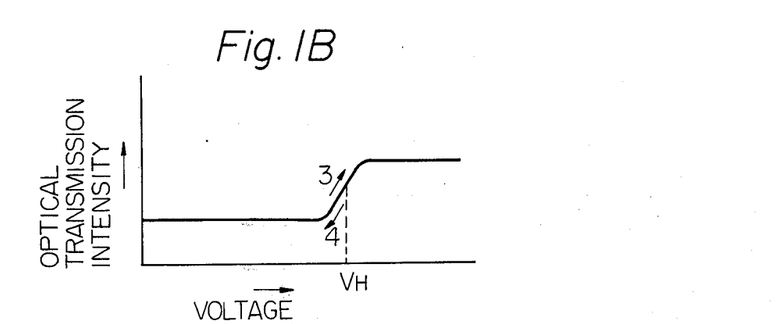
Figure 1C:
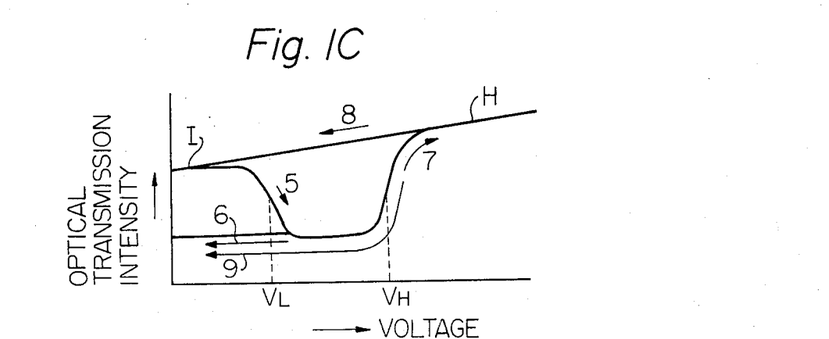

The relation between the optical transmission intensity of the liquid crystal and the electric voltage to which the liquid crystal is subjected, which is obtained in case the liquid crystal having an optical storage effect is held between two glass plates having optically transparent electrodes and a voltage is applied between said optically transparent electrodes, is as shown in FIGS. 1A through 1C. FIG. 1A is of the case that a cholesteric liquid crystal is added to an n-type nematic material. In this case, if the voltage is increased, the optically transparent state of the liquid crystal in which the optical transmission intensity is high will change along the arrow 1 so as to reach a milky turbid state in which the optical transmission intensity is low. Here, $V_L$ represents the threshold voltage. But if the voltage is decreased in this state, the milky turbid state will be kept so as to be along the arrow 2. FIGS. 1B and 1C are of the case that a cholesteric phase liquid crystal having a property that the molecular axes are all aligned in the direction of the applied electric field when the field strength becomes above a threshold level. In the case of FIG. 1B, if the voltage is increased, the milky turbid state will reach an optically transparent state along the arrow 3 with the threshold voltage $V_H$ as a boundary but, if the voltage is decreased, the state will return to the original milky turbid state along the arrow 4. In the case of FIG. 1C, before the voltage is applied, the state is an optically transparent state I but, if the voltage is increased to be higher than the threshold voltage $V_L$, the optically transparent state will become a milky turbid state along the arrow 5. If the voltage is decreased from this state, the milky turbid state will be kept along the arrow 6. If the voltage is increased from the milky turbid state so as to be higher than the threshold voltage $V_H$, the state will become an optically transparent state H along the arrow 7. If the voltage is quickly removed under this state, the optically transparent state H will again become the optically transparent state I along the arrow 8 after passing through an opaque state momentarily. Further, if the voltage is gradually removed under the state H, the optically transparent state will become the milky turbid state along the arrow 9. The above characteristics will be obtained also in the case of applying an alternating voltage.

Particularly, the case of FIG. 1C will be obtained in case the electrode surface is treated by such method as hydrophobicizing a certain wall surface to obtain a perpendicular molecular orientation as will be described later.

The cholesteric phase mixed liquid crystals respectively corresponding to FIGS. 1A and 1C will have an optical storage effect even in case the electric field is cut off. Therefore, they are used in displaying devices but have a defect that response time of such means is considerably longer than that of displaying devices using a nematic liquid crystal. Further, in the cholesteric phase mixed liquid crystal corresponding to FIG. 1B, an alternating current bias must be always applied in order to maintain displayed image, the response time is several 10 milliseconds, further it has no threshold voltage definite enough, therefore, the ratio of optical transparencies of the displaying state and nondisplaying state, that is, the contrast ratio is reduced and there have been such difficulties in applying it to a matrix-addressed liquid crystal display device.

The present invention has successfully solved the above described difficulties by utilizing the features of the nematic-cholesteric phase transition phenomenon occurring near the thershold voltage $V_H$ of the cholesteric phase mixed liquid crystals having the characteristics of FIGS. 1B and 1C.

A principal object of the present invention is, therefore, to provide a matrix-addressed liquid crystal display device which can increase the scanning speed.

Another object of the present invention is to provide a matrix-addressed liquid crystal display device of a large size and large capacity.

A further object of the present invention is to provide a matrix-addressed liquid crystal display device wherein no cross image is produced.

Another object of the present invention is to provide a matrix-addressed liquid crystal display device wherein the driving voltage is low and the service-life is long.

An embodiment of the present invention shall be explained in the following with reference to the drawings, in which.

Before explaining the matrix-addressed liquid crystal display device of the present invention in detail, an elementary cell in the matrix-addressed liquid crystal panel shall be explained.

Figure 2:
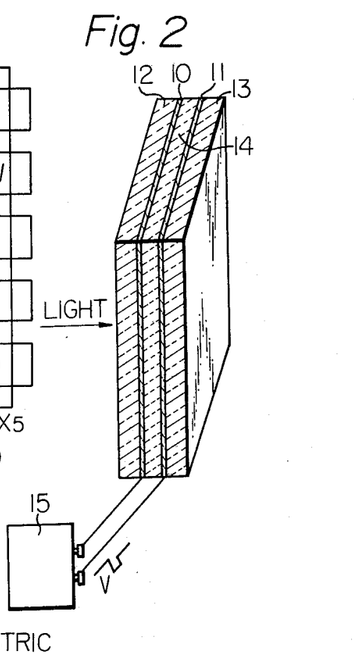
FIG. 2 shows a fragmental perpsective view of an elementary cell used in the present invention.

In FIG. 2 showing an elementary cell, 10 and 11 are optically transparent electrodes made of a film of tin oxide or indium oxide and formed respectively on each of optically transparent glass plates 12 and 13 by means of vacuum evaporation. These glass plates are opposed to each other with the electrode deposited sides inside to hold a liquid crystal 14 between them. A source 15 for generating a voltage wave form of any optional function is connected to the respective electrodes through lead wires. The optically transparent electrode 11 can be replaced with such metal which reflects lights as aluminum, nickel or the like so as to render the device to be of a reflecting type.

The liquid crystal mixture to be used in the present invention has the characteristics of FIGS. 1B and 1C and the cholesteric phase liquid crystals showing these behaviors are:

i. A three-component mixed liquid crystal of a p-type nematic material, n-type nematic material and cholesteric material;

ii. A two-component mixed liquid crystal of a p-type nematic material and cholesteric material;

iii. a mixed liquid crystal of a p-type nematic material, n-type nematic material and such photoactive material as l-menthol (which acts to replace the cholesteric material).

The p-type nematic materials are:
p-alkoxybenzylidene p'-cyanoaniline,
p-cyanobenzylidene p'-alkoxyaniline,
p-alkylbenzylidene p'-cyanoaniline,
p-cyanobenzylidene p'-alkylaniline,
p-alkylcarboxybenzylidene p'-cyanoaniline,
p-alkyl p'-alkylazoxybenzene,
p-alkyl p'-cyanodiphenyl and
p-alkoxy p'-cyanodiphenyl
and one or more of them are used.

The n-type nematic materials are:
p-alkoxybenzylidene p'-alkylaniline and
p-alkylcarboxybenzylidene p'-alkylaniline
and one or more of them are used.

The cholesteric materials are:
cholesterin derivatives,
cholesternol derivatives,
coprostanol derivatives, and
epicholesternol derivatives,
and one or more of them are used.

Figure 3:
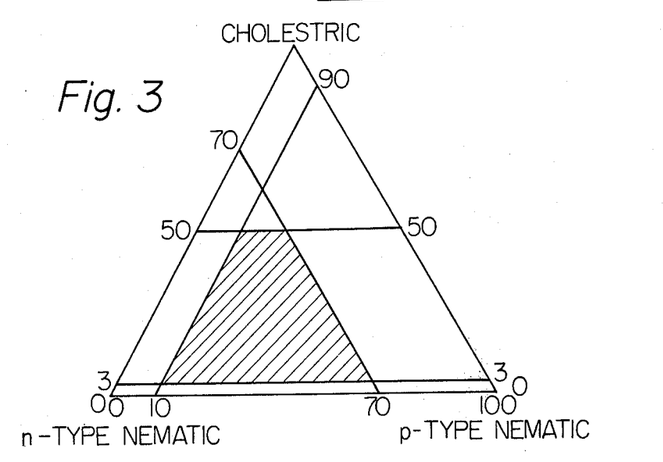
FIG. 3 shows mixing rates of three-component liquid crystals used in the present invention.

A preferable mixture composition is:
3 to 50% by weight of the cholesteric material,
10 to 67% by weight of the p-type nematic material and
30 to 87% by weight of the n-type nematic material
and is illustrated as the composition represented by the hatched part in FIG. 3.

The reasons for limiting the mixture composition in the three-component series cholesteric phase liquid crystal are as follows. When the cholesteric material is less than 30%, the liquid crystal in the milky turbid state with a voltage exceeding threshold voltage $V_L$ will no longer keep the milky turbid state, if the voltage is made zero. In addition, the nematic to cholesteric phase transition time to be described later becomes too long to be applied to the display device of the present invention. Further, when it is more than 50%, the threshold voltage $V_H$ will become higher in proportion to the concentration of the cholesteric material and such a higher rate is not desirable. For example, when it is more than 50%, the threshold voltage $V_H$ will be more than 100 volts.

In case the p-type nematic material is less than 10%, the property that the mixed liquid crystal molecules become to be aligned in the direction of the electric field will become weak and the threshold voltage $V_H$ will become higher.

In case the n-type nematic material is less than 30%, the liquid crystal molecules will be no longer oriented in normal direction with respect to the wall surface of the optically transparent cell and it is not desirable as a mixed liquid crystal to be used in the liquid crystal means of the present invention. In this connection, it is necessary that the mixed liquid crystal of the p-type nematic material and n-type nematic material should be of a p-type nematic phase as a whole.

The preferable mixing rates of the p-type nematic material and cholesteric material in the two-component mixed liquid crystal are:
50 to 97% by weight of the p-type nematic material and
3 to 50% by weight of the cholesteric material.

The reasons for limiting the mixed components in the two-component series cholesteric phase liquid crystal are as follows. When the cholesteric material is less than 3%, the liquid crystal subjected to a voltage exceeding the threshold voltage $V_L$ so as to be in a milky turbid state will no longer keep the milky turbid state, if the voltage is made zero. Further, when it is more than 50%, the threshold voltage $V_H$ will become higher in proportion to the concentration of the cholesteric material, which is not desirable. For example, when it is more than 50%, the threshold voltage $V_H$ will be ordinally more than 100 volts.

Figure 4A:
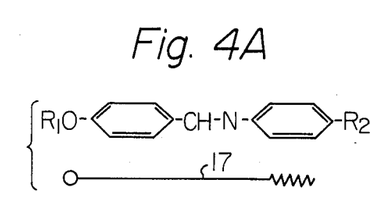
FIGS. 4A and 4B are explanatory views of a perpendicular orientation treatment employed in the present invention.
Figure 4B:
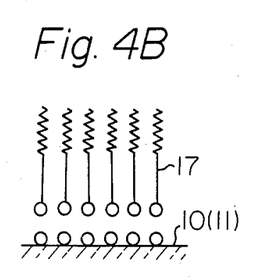

Further, the perpendicular orientation treatment of the wall surface of the optically transparent plate consisting of a glass plate having optically transparent electrodes is based on the following principle. As shown in FIG. 4A, the often used nematic liquid crystal molecule has a hydrophilic group (represented by 0) at one end and hydrophobic group (represented by /W). Therefore, when it is treated to be oriented in perpendicular direction to the wall surface, that is, the wall surface is hydrophobicized or hydrophilicized as will be detailed in the following, the molecule will be oriented normally to the wall surface. In other words, when the wall surface is hydrophobicized, the molicules will be arranged so that the hydrophobic group of the molecule will approach the wall surface but the hydrophilic group will separate away from the wall surface. If the wall is hydrophilicized, the state will be reverse to the above (see FIG. 4B).

i. As a hydrophilicizing method, the wall surface is cleaned with an aqueous solution of NaOH or a chromic acid mixture.

ii. As a hydrophobicizing method:
   a. For example, the optically transparent plate surface is chemically treated with a silane (such as dimethyl-dichlorosilane, diethoxy-dimethyl silane and dimethoxy-dimethyl silane) directly or after depositing silicon monoxide or silicon dioxide on the surface by vacuum evaporation;
   b. The optically transparent plate surface is coated with such surface active agent as lecithin, silicone varnish or sodium oleate; or
   c. A surface active agent (for example, sodium oleate) is added to the liquid crystal by an amount of less than 1%.

As a preferable example, SiO is deposited on the wall surface by vacuum evaporation. Such wall surface is dipped in a solution prepared by diluting dimethyldichlorosilane to be 1 to 10% with toluene at the room temperature for more than about 5 minutes, is then cleaned with running water and further cleaned with ultrasonic cleaner in ethanol.

The behavior of the liquid crystal cell of the present invention formed as mentioned above shall be again explained.

Figure 5:
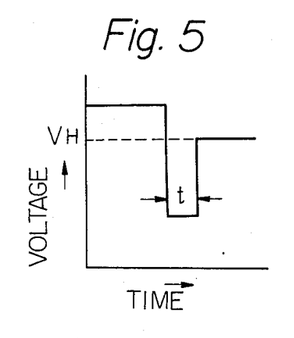
FIG. 5 is a diagram showing the variation in the voltage applied to the liquid crystal.

In the before described elementary cell, such voltage as is shown in FIG. 5 is applied between the electrodes. That is, a voltage higher than the threshold voltage $V_H$ is applied in advance (in this case, the state of the liquid crystal in the cell will be optically transparent), then the voltage is reduced to be lower than the threshold voltage $V_H$ and, after short time period $t$, the voltage is again elevated to be kept at a value near the threshold voltage $V_H$.

When such voltage variation as is mentioned above is given;

i. in case the time period $t$ is very short, that is, when, for the critical pulse width $t_o$ for the nematic to cholesteric phase transition of the cholesteric phase liquid crystal in the cell, $0 \leq t \leq t_o$, the optically transparent state will be maintained as it is in spite of the voltage variation and ii. in case the pulse width $t$ is longer than the critical pulse width $t_o$, that is, when $t \geq t_o$, the optically transparent state will shift to a milky turbid state which will be stabilized after a certain time period.

Figure 6A:
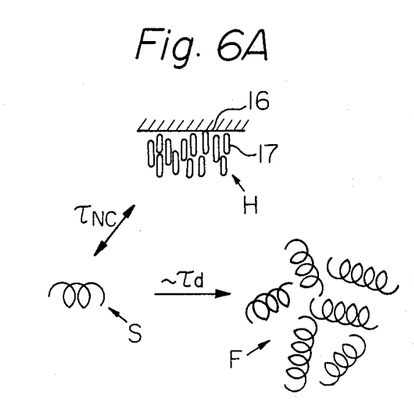
FIG. 6A is an explanatory view showing variations in molecular orientation responsive to nematic-cholesteric phase transition.

This behavior of the liquid crystal is caused because the arrangement of the liquid crystal molecules will vary, when the applied voltage is varied in the state (ii) as above to a value smaller than the threshold voltage $V_H$. That is to say, under the applied voltage higher than the threshold voltage $V_H$, the axial directions of the liquid crystal molecules 17 are uniformly arranged in the direction parallel with the electric field, that is, in the direction normal to the electrode surface 16 (see FIG. 6A). However, when the applied voltage is reduced to a value smaller than the threshold voltage $V_H$, a molecular force tending to return for itself to the arrangement of cholesteric phase liquid crystal molecules from the arrangement of nematic phase liquid crystal molecules of the optically transparent state H will act to realize a cholestric helicoidal arrangement in a very short transition time $\tau_{NC}$ (wherein N represents a nematic phase and C represents a cholesteric phase). When this arrangement S is completed, it will become a trigger to surely realize a milky turbid state F after a time $\tau d$ and, even if the applied voltage is again kept near the threshold voltage $V_H$, the milky turbid state F will remain stable for a long time. When $0 \leq t \leq t_o$, this helicoidal arrangement S will not be completed and therefore no milky turbid state F will be realized. As described later, in the liquid crystal display device of the present invention, $t_o \approx 8$ and $\tau_d \approx 300$ millisecond.

In the conventional means using the cholesteric phase liquid crystal, the order to vary the optical transparent state to a milky turbid state by applying a voltage higher than the threshold voltage $V_L$ in FIG. 1A, it is necessary to maintain the applied voltage for at least 100 to 300 milliseconds. However, in the present invention, it is possible to shift the state by such a short pulse as about $t_o=8$ milliseconds, and this is the most important feature of the present invention.

Some examples shall be explained in the following:

EXAMPLE 1:

A pair of optically transparent plates respectively provided with optically transparent electrodes had silicon monoxide SiO deposited by vacuum evaporation on the inside wall surfaces, were dipped in a solution prepared by diluting dimethyldichlorosilane to be about 5% with toluene for more than 5 minutes, were then washed with running water and were further cleaned with ultrasonic cleaner in ethanol. In case such silane-treated optically transparent plates as above were used and a mixed liquid crystal of 60% by weight p-methoxybenzylidene p'-n butylaniline,
25% by weight p-n butoxybenzylidene p'-cyanoaniline and
15% by weight cholesteryl chloride was used, the thickness of the liquid crystal was 12 μm, the critical pulse width $t_o$ was 8 milliseconds at the room temperature, the time $\tau d$ for the optically transparent state to shift to a milky turbid state was about 300 milliseconds and the threshold voltage $V_H$ was 27 volts.

EXAMPLE 2:

In case optically transparent plates of the same wall surfaces as in Example 1 were used and a mixed liquid crystal of 50% by weight p-methoxybenzlidene p'-n butylaniline,
20% by weight p-n butoxybenzylidene p'-cyanoaniline and
30% by weight cholesteryl chloride was used, the thickness of the liquid crystal was 12μm, the critical pulse width $t_o$ was 3 milliseconds at 40°C., $\tau_d$ was about 100 m.sec. and the threshold voltage $V_H$ was 35 volts.

EXAMPLE 3:

In case optically transparent plates treated in the same manner as in Example 1 were used and a mixed liquid crystal of 59% by weight p-methoxybenzylidene p'-n butylaniline, 26% by weight p-n butoxybenzylidene p'-cyanoaniline and 15% by weight cholesteryl nonanoate was used, the thickness of the liquid crystal was 12μm, the critical pulse width $t_o$ was 4.5 m.sec. at room temperature, $\tau_d$ was about 300 m. sec. and the threshold voltage $V_H$ was 35 volts.

EXAMPLE 4:

A pair of optically transparent plates respectively provided with optically transparent electrodes were cleaned with a mixed solution of sodium dichromate and sulphuric acid, were then washed with running water and were further cleaned with ultrasonic cleaner in ethanol. In case such optically transparent plates as above were used, are mixed liquid crystal of 80% by weight p-n buthoxybenzilidene p'-cyanoaniline and 20% by weight cholester 1 myristate was used and the thickness of the liquid crystal was 12μm, the critical pulse width $t_o$ was 3 m.sec. at 70°C, $\tau_d$ was about 100 m.sec. and the threshold voltage $V_H$ was 32 volts.

EXAMPLE 5:

In case optically transparent plates treated in the same manner as in Example 1 were used, a liquid crystal mixture of 90% by weight p-hexylbenzilidene p'-cyanoaniline and 10% by weight cholesteryl chrolide was used and the thickness of the liquid crystal was 11μm, the critical pulse width $t_o$ was 15 m.sec. at room temperature, $\tau_d$ was about 300 m.sec. and the threshold voltage $V_H$ was 10 volts.

In the above described examples, in case a voltage was applied to the electrodes so as to shift the optically transparent state to a milky turbid state, the contrast of the milky turbid state with the optically transparent state was recognized to be higher than the contrast in the conventional liquid crystal display devices. Further, even if an alternating voltage was used instead of the direct current voltage, the same results were obtained.

Figure 6B:
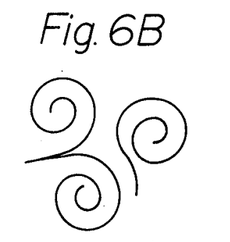
FIG. 6B is an explanatory view of scroll pattern observed in the liquid crystal.

Further, when the liquid crystal having the characteristics shown in FIG. 1C of the present invention is inserted between two glass plates treated to achieve the perpendicular molecular orientation and having the optically transparent electrodes, and the optically transparent state I is observed under a microscope, a cholesteric phase will be observed and such scroll pattern as in FIG. 6B will be seen. As the spacing of the scroll of this structure roughly coincides with the cholesteric helicoidal pitch of the used mixed liquid crystal, in FIG. 1C, the direction of the spiral axis in the optically transparent state I is parallel with the wall surface. On the other hand, the optically transparent state H is a state in which substantially all the molecular axes are arranged in the direction of the electric field by the electric field. This may be considered to be an extreme state when the direction of the helicoidal axis is parallel with the wall surface and the pitch is infinite as it were. Therefore, the variation from the nematic optically transparent state H to the cholesteric optically transparent state I which will occur when the electric field is quickly removed can be realized by only the reorientation of the liquid crystal molecules to a helicoidal arrangement while the direction of the axis is unchanged as it is. Therefore, the time required for the state variation (from H to I) will become the shortest of all. However, in case the liquid crystal molecules are treated to be arranged in parallel with the wall surface by such method as rubbing the wall surface in one direction with, for example, absorbent cotton, the direction of the helicoidal axis in the cholesteric optically transparent state I will be perpendicular to the wall surface. Therefore, the helicoidal axis direction must rotate by 90° for the variation from the nematic optically transparent state H to the cholesteric optically transparent state I and the time required for the state variation (from H to I) will become longer. In case no orienting treatment is applied to the wall surface, the time required for the state variation (from H to I) will take a value between the cases of applying the above mentioned perpendicular and parallel orientation treatments. The differences in the time required for the state variation (from H to I) by various orienting treatments are shown in the following table:

| Wall surface treatment | Time for the state variation (from H to I) |
| --- | --- |
| No treatment | 13 seconds |
| Perpendicularly orienting treatment | 1.5 seconds |
| Parallelly orienting treatment | 50 seconds |

Figure 7A:
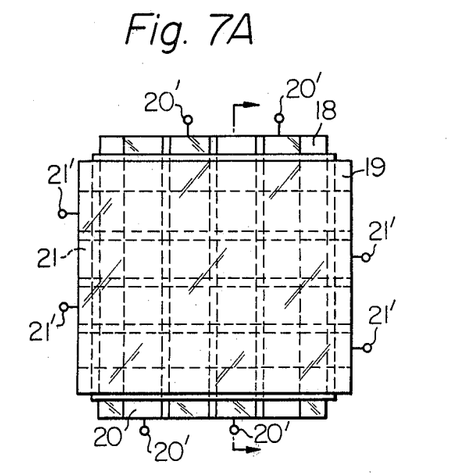
FIGS. 7A and 7B are explanatory plane view and sectioned view of a matric-addressed liquid crystal display device of the present invention.
Figure 7B:
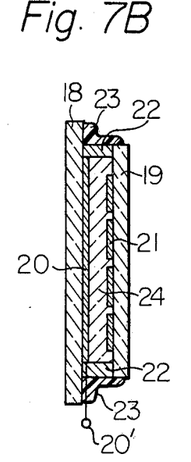

A matrix panel can be constructed by the above described elementary cells as shown in FIGS. 7A and 7B, in which FIG. 7A is a plane view and FIG. 7B is a sectioned view. 18 and 19 are optically transparent plates consisting of glass plates and having parallel strip-shaped electrodes 20 and 21 arranged on the insides so as to intersect (at right angles) with each other in the strip directions. 20' and 21' are terminals every other of which is led out on the opposite side. 22 is a spacer arranged in between the optically transparent plates 18 and 19. The space enclosed with the spacer 22 and optically transparent plates 18 and 19 is filled with a cholesteric phase mixed liquid crystal. The spacer 22 is sealed on the periphery with an adhesive so as to bridge the optically transparent plates 18 and 19.

EXAMPLE 6:

A Pyrex glass plate of 100 × 100 mm. was used for the material of the optically transparent plate, a tin oxide plate of a width of 400μm. and length of 100 mm. was used for the material of the parallel electrode and an epoxy adhesive was used for the adhesive. A pair of the optically transparent plates provided with the optically transparent electrodes had silicon monoxide layer deposited by vacuum evaporation on the inside wall surfaces and were then treated to be hydrophobicized with a toluene solution of 1 to 10% dimethyldichlorosilane for 5 minutes. A mixed liquid crystal of a composition of 60% by weight p-methoxybenzylidene p'-n butylaniline as an n-type nematic material, 25% by weight p-n butoxybenzylidene p'-cyanoaniline as a p-type nematic material and 15% by weight chloride as a cholesteric material was used.

Figure 8A:
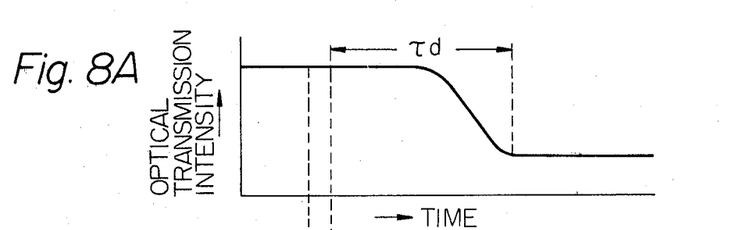
FIGS. 8A and 8B are explanatory diagrams of the voltage applied to the liquid crystal and optical transmission intensity.
Figure 8B:
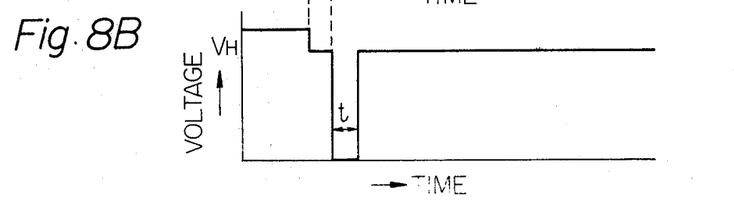

In the case of such matrix formation as mentioned above, the voltage is applied as follows. A voltage higher than the threshold voltage $V_H$ is applied between the row electrodes 21 and column electrodes 20 (see FIG. 8B) so that the entire surface will be optically transparent and is then set at a voltage near the threshold voltage $V_H$. This set value is selected to stabilize both optically transparent state and milky turbid state. Then, only the voltage applied to the selected intersection of the row electrode and column electrode is dropped only for the time $t$ as shown in FIG. 8B. Then, it is again returned near to the threshold voltage $V_H$. When this time $t$ is made longer than the critical pulse width $t_o$ as described above, after the time $\tau_d$, the optically transparent state will become a milky turbid state at the selected intersections. Thereby the "writing-in" will be completed.

Figure 9A:
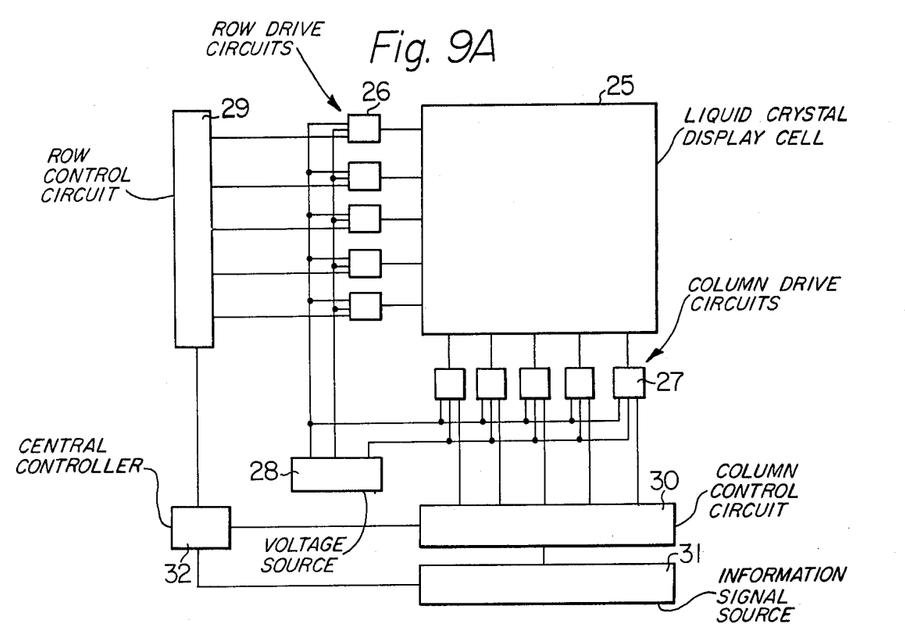
FIG. 9A is a circuitry diagram showing a driving circuit employed in the present invention.

In FIG. 9A showing an exemplary circuit of the matrix-addressed liquid crystal display device, 25 is a matrix type liquid crystal displaying section, of which structure is the same as is already explained in FIGS. 7A and 7B. 26 and 27 are respectively row driving and column driving circuits connected respectively with the row and column electrodes of the matrix displaying section. The row driving circuit and column driving circuit are formed of mechanical switches, transistors and such switches as electric field effect type transistors so as to give or remove any desired voltage to or from the respective electrodes. FIGS. 9B–9D and FIGS. 9E–9G are circuitry diagrams of certain embodiments of the row driving circuit 26 and column driving circuit 27, respectively, each of which is selectively used depending on the respective operating methods described later. 28 is an electric source to give a voltage to the electrodes of the displaying section 25. A variable resistor to give any desired voltage to the electrodes and others are contained in the electric source 28. 29 is a row controlling circuit which is to open and close the switches in the row driving circuit 26 and for which, for example, a shift register circuit is used. 30 is a column controlling circuit to open and close the switches in the column driving circuit 27 with a signal from an information source 31. 32 is a central controlling circuit acting to deliver a controlling signal for synchronizing the row controlling circuit 29 and column controlling circuit 30 with each other to the row controlling circuit and column controlling circuit, also to deliver order signals for starting and ending the delivery of displaying signals to the information source 31, and so on. In the present invention, the displaying signals from the information source 31 is forwarded to the column controlling circuit 30 by the central controlling circuit 32 so as to operate the column driving circuit 27 to give the voltage from the electric source 28 to the displaying section 25, and the row controlling circuit 29 is operated as synchronized with the column controlling circuit 30 by the central controlling circuit 32 so as to give the voltage from the electric source circuit 28 to the row driving circuit 26.

The operation of the matrix-addressed liquid crystal display device of the present invention shall be explained in the following. A voltage higher than the threshold voltage $V_H$ is given in advance to all the elements of the displaying section 25 so that the cholesteric phase mixed liquid crystal will be in an optically transparent state (which is called "erased" state).

Then, according to the signal from the information source 31, the row electrodes are scanned one by one in turn by the operation of the central controlling circuit 32, row controlling circuit 29 and row driving circuit 26.

Also, by the central controlling circuit 29, a voltage according to the information signal is given to the column electrodes as synchronized with the scanning of the row electrodes. Thereby, the voltage given to the selected intersection is made lower than the threshold voltage $V_H$ (usually a zero potential). Thus the selected intersection shifts from the optically transparent state to a milky turbid state. At the samee time, the voltage applied to the nonselected intersection is made near or above the threshold voltage so as to maintain the optically transparent state as it is. As $t_o \approx 8$ milliseconds as already explained, the time required to scan the entire panel can be reduced to be much shorter than in the conventional system.

Figure 10:
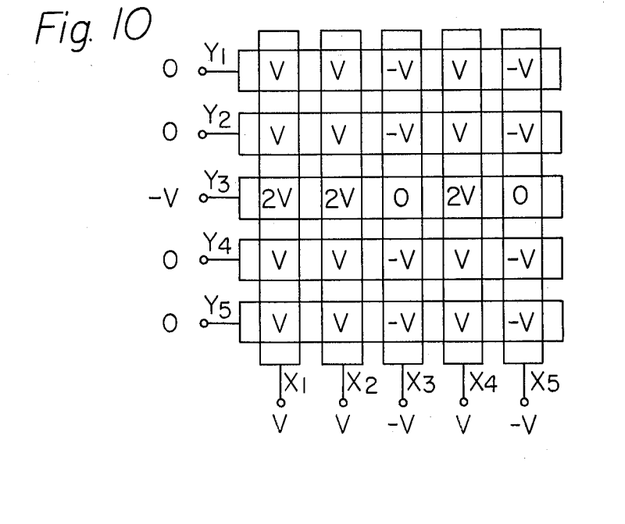
FIGS. 10, 12, 13A and 13B are explanatory views for operating methods of the matrix-addressed liquid crystal display device of the present invention.

The method of operating the matrix-addressed liquid crystal display device of the present invention shall be explained in the following.

i. Direct current driving system:

As shown in FIG. 10, in order to simplify the explanation, a matrix of row electrodes $Y_1$ to $Y_5$ and column electrodes $X_1$ to $X_5$ shall be used. It is assumed that, while the row electrode $Y_3$ is being scanned, information signals enter the column electrodes $X_3$ and $X_5$, that is to say, $(Y_3,X_3)$ and $(Y_3,X_5)$ are made selected intersections. The illustrated voltages O, $-V$ and V are given to the row electrodes and column electrodes respectively from the row driving circuit and column driving circuit. V, $-V$, O and 2V at the respective intersections are voltages applied to the respective intersections in the matrix (these voltages are represented by the differences of the potentials applied to the row electrodes and column electrodes). V is set near the threshold voltage $V_H$.

As will be obvious from FIG. 10, the voltage applied to selected intersections $(Y_3,X_3)$ and $(Y_3,X_5)$ is zero. Therefore, these parts vary to the milky turbid. Further, the voltage applied to the other intersections, that is, the nonselected intersections on the row electrode $Y_3$ is 2V and the state remains optically transparent.

Figure 11:
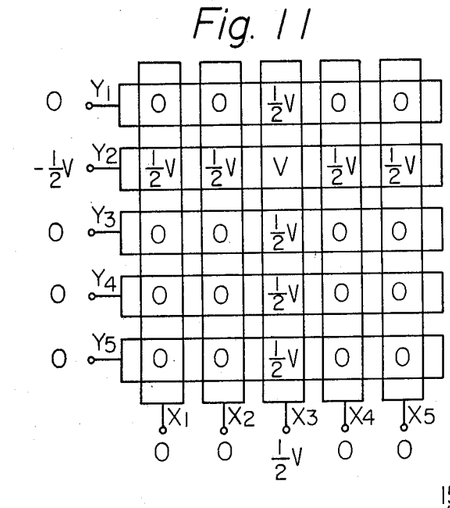
FIG. 11 is an explanatory view for a conventional operating method of the matrix-addressed liquid crystal display devices.

In the case of making a matrix-addressed liquid crystal display device by using a liquid crystal having the optical transmission intensity - voltage characteristics shown in FIG. 1A, in the conventional method, as in FIG. 11, ½V and $-½V$ are applied respectively on the row and column electrodes including a selected intersection and a voltage V higher than the threshold voltage $V_L$ is applied on the selected intersection. In this method, a voltage of ½V or $-½V$ will be applied also on the other intersections than the selected intersection on the row and column electrodes including the selected intersection and, after all, unless the variation of the light transmission intensity near the threshold voltage $V_L$ is sharp, the optical transmission intensity at the applied voltage ½V or $-½V$ will be reduced and the contrast of the selected intersection to the nonselected intersection in the displaying section has been low.

On the other hand, in the method of the present invention, as a voltage lower than the threshold voltage $V_H$ is applied on the selected intersection and a voltage equal to or higher than the threshold voltage $V_H$ is applied on the other intersections, only the state of the selected intersection will vary but the states of all the other interssection will not vary and, therefore, a display of high contrast will be obtained, that is, no cross image will be produced.

In order to have all the intersections in the matrix in an erased state (that is, an optically transparent state), all the potentials of the row electrodes may be made $-V$ and all the potentials of the column electrodes may be made V. Further, in FIG. 10, even if the potentials of all the electrode are elevated or lowered by the same magnitude, the results will be the same. Also, in FIG. 10, even if V is made $-V$ and $-V$, is made V, the results will be the same. Therefore, if the potentials given to the electrodes are reversed alternately, the deterioration of the liquid crystal by the electrolysis can be prevented and, therefore, the service life can be made long.

Figure 12:
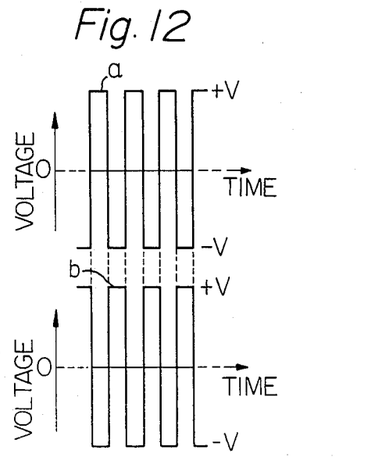

The alternating voltage $a$ in FIG. 12 can be used instead of the above described voltage V and the alternating voltage $b$ of which phase is deviated by $\tau$ from that of the voltage $a$ can be used instead of $-V$.

Further, if the potential of the row electrode being scanned in FIG. 10 is $-V + V_1$ wherein $V_1 < V$, the voltage of the selected intersection will be able to be made $V_1$ and thereby the milky turbid state will be able to be controlled.

Further, if only the sign of the signal voltage applied to the row electrodes is reversed, the milky turbid state and optically transparent state will be able to be reversed to each other.

If the V shown in FIG. 10 is so selected as to be lower than the threshold voltage $V_H$ but higher than $\frac{1}{2}V_H$, when the intersection to which a voltage of 2V is applied is made a selected intersection, it will be able to be applied also to the conventional display device wherein the selected intersection is optically transparent.

ii. Another driving system:

This method is to make the voltage applied to one or a plurality of row electrodes following the row electrode being scanned to be lower than the threshold voltage $V_H$.

Figure 13A:
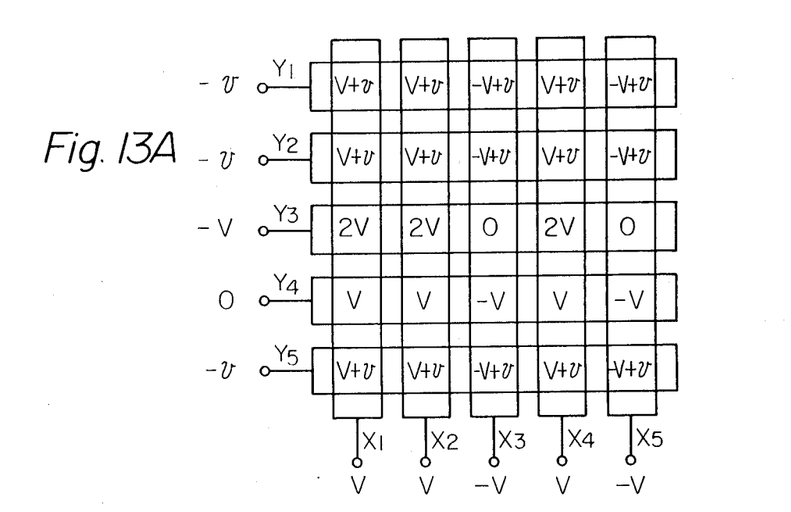

It shall be explained in the following with reference to FIGS. 13A and 13B. The voltage applied to the intersection on the row electrode $Y_4$ following the row electrode $Y_3$ being scanned is made lower than the threshold voltage $V_H$. V is a direct current voltage and $v$ is a high frequency voltage of such wave form as $a$ or $b$ in FIG. 12.

Figure 13B:
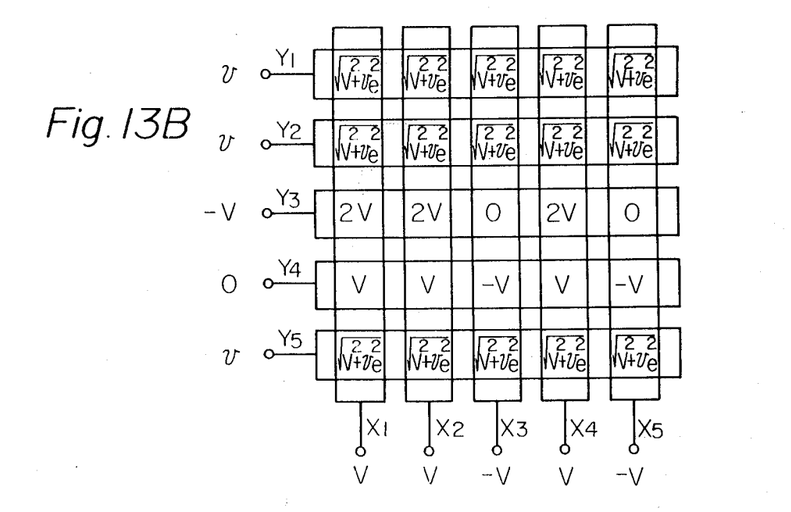

As shown in FIG. 13B, the voltage of the selected intersections $(Y_3, X_3)$ and $(Y_3, X_5)$ on the row electrode $Y_3$ is zero and the voltage of the nonselected intersections is 2V. Further, the voltage applied to the intersections on the row electrode $Y_4$ is V and the voltage applied to the intersections on the other row electrodes is $\sqrt{V^2 + v_e^2}$.

Therefore, if $\sqrt{V^2 + v_e^2}$ is set near the threshold voltage $V_H$, the voltage V lower than the threshold voltage $V_H$ will be applied to the intersections on the row electrode $Y_4$ and a shift from the nematic phase to the cholesteric phase will be likely to occur. Therefore, in case the row electrode $Y_4$ is then scanned and the voltage of the selected intersection is made zero, the phase shift will occur by a much shorter pulse width $t_o$ at the selected intersection. On the other hand, since an effective voltage $2V > \sqrt{V^2 + v_e^2} \approx V_H$ will be applied to the nonselected intersection, there no phase shift will occur and an optically transparent state will be kept. Thus the scanning speed can be increased.

iii. Image fixing system:

In the structure of FIG. 2, particularly in case a cholesteric liquid crystal of the optical transmission intensity - voltage characteristics shown in FIG. 1C is used, after the "writing-in" by the signal is completed, if all the applied voltages are interrupted at once, an optically transparent state will be memorized along the arrow 8 in FIG. 1C, a milky turbid state will be memorized along the arrow 6 and, therefore, the written-in image will be able to be memorized as it is. The memorizing time in such case depends on the film thickness of the used cholesteric phase liquid crystal and the helicoidal pitch but it is possible to memorize for more than several minutes.

For example, a mixed liquid crystal of
60% by weight p-methoxybenzylidene p'-n butylaniline, 25% by weight p-n butoxybenzylidene p'-cyanoaniline and 15% by weight cholesteryl chloride is of a cholesteric helicoidal pitch of 1.0 $\mu$m. In case it is used with a film thickness of 12$\mu$m., by the above mentioned operation, the memorizing state will last for more than 1 week. Further, if the film thickness is made larger, the memorizing time will become longer.

Figure 9B:
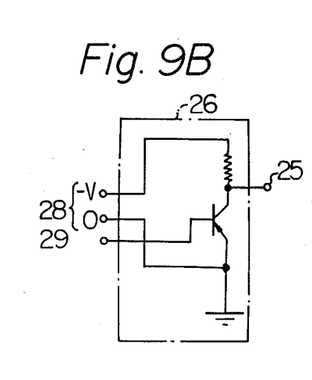
FIG. 9B through 9D are circuitry diagrams showing respective embodiments of row-electrode driving circuit in the circuit of FIG. 9A.
Figure 9C:
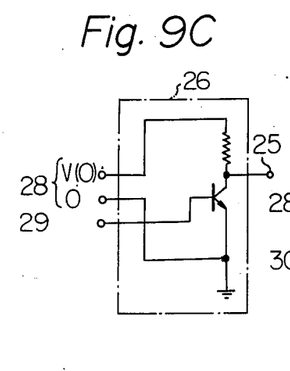
Figure 9D:
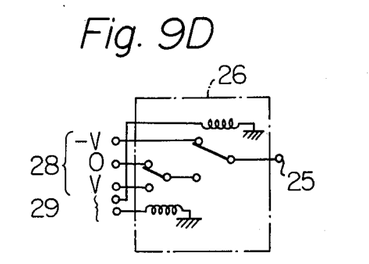
Figure 9E:
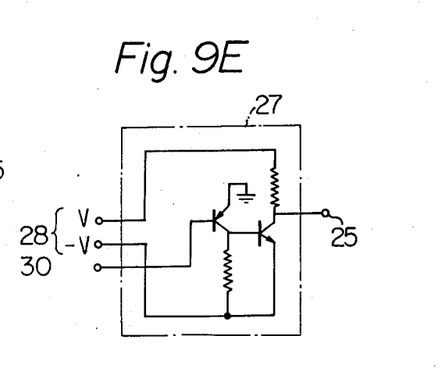
FIG. 9E through 9G are circuitry diagrams showing respective embodiments of column-electrode driving circuit in the circuit of FIG. 9A.

Further, some examples shall be explained in the following:

EXAMPLE 7:

When a mixed liquid crystal of 60% by weight p-methoxybenzylidene p'-n butylaniline, 25% by weight p-n butoxybenzylidene p'-cyanoaniline and 15% by weight cholesteryl chloride was inserted as a cholesteric phase liquid crystal between glass plates each having respectively 100 row and column electrodes of tin oxide, the thickness of the cholesteric phase liquid crystal was made 12$\mu$m, the line and column driving circuits 26 and 27 respectively as shown in FIGS. 9B and 9E were used, $-27V$ were applied on the column electrode including a selected intersection, $+27V$ were applied on the other column electrodes, $-27V$ were applied on the scanning row electrode and the other row electrodes were made zero volt, $t_o$ was 8 milliseconds at room temperature and the entire panel could be scanned within 800 m.sec. In this example, in case the driving method (ii) was applied, $t_o$ became 3 m.sec. at room temperature and the entire panel could be scanned within 300 m.sec. When all the applied voltages were interrupted at once, the milky turbid and optically transparent states were memorized as they were and were kept for more than one week.

Figure 9F:
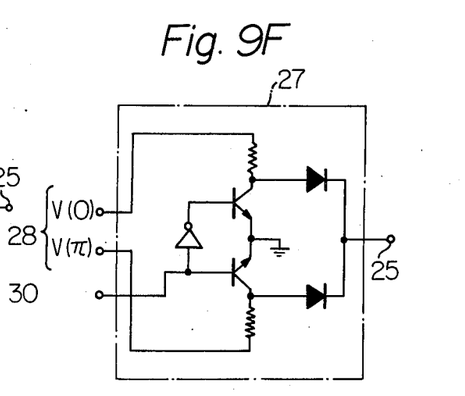

EXAMPLE 8:

When a mixed liquid crystal of 80% by weight p-n butoxybenzylidene p'-cyanoaniline and 20% by weight cholesteryl myristate was inserted as a cholestic phase liquid crystal between glass plates each having respectively 100 row and column electrodes of tin oxide, the thickness of the cholesteric phase liquid crystal was made 12$\mu$m., the display panel was kept at 70°C. with a panel heater, the line and column driving circuits 26 and 27 as shown in FIGS. 9C and 9F were used, an alternating voltage of 32 volts at 1 KH$_z$ was applied on the column electrode including a selected intersection, an alternating voltage deviated by 180° in the phase from the above mentioned alternating voltage was applied on the other column electrodes, the same alternating voltage as on the column electrode including the selected intersection was applied on the scanning row electrode and the other row electrodes were made zero volt, $t_o$ was 3 milliseconds and the entire panel could be scanned within 300 m.sec.

Example 9:

When a mixed liquid crystal of 90% by weight p-hexylbenzylidene p'-cyanoaniline and 10% by weight cholesteryl chloride was inserted as a chloresteric phase liquid crystal between glass plates each having respectively 100 row and column electordes of tin oxide, coated on the surface with silicon monoxide and then treated for achieving the perpendicular molecular orientation with a toluene solution of dimethyldichlorosilane, the thickness of the chloresteric phase liquid crystal was made 11μm, the row and column driving circuits 26 and 27 as shown in FIGS. 9C and 9F were used, an alternating voltage of 10 volts at 1 KH$_z$ was applied on the column electrode including a selected intersection, an alternating voltage deviated by 180° in the phase from the above mentioned altenating voltage was applied on the other column electrodes, the same alternating voltage as on the column electrode including the selected intersection was applied on the scanning row electrode and the other row electrodes were made zero volt, $t_o$ was 15 milliseconds at room temperature and the entire panel could be scanned within 1.5 seconds. When all the applied voltages were interrupted at once, the milky turbid and optically transparent states were memorized as they were and kept for more than one week.

Figure 9G:
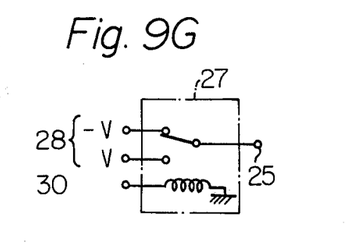

Example 10:

When a mixed liquid crystal of 60% by weight p-methoxybenzylidene p'-n butylaniline, 25% by weight p-n butoxybenzylidene p'-cyanoaniline and 15% by weight cholesteryl chloride was inserted as a cholesteric phase liquid crystal between glass plates each having respectively 100 row and column electrodes of tin oxide and treated on the surface for achieving the perpendicular molecular orientation with dimethyldichorosilane, the thickness of the cholesteric phase liquid crystal was made 12μm., the row and column driving circuits 26 and 27 as shown in FIGS. 9D and 9G, respectively, were used, −10 volts were applied on the column electrode including a selected intersection, 10 volts were applied on the other column electrodes, −10 volts were applied on the scanning row electrode, the 9 row electrodes following the scanning row electrode were made zero volt and an alternating voltage of 15 volts at 1 KH$_z$ was applied on the other row electrodes, $t_o$ was 3 milliseconds at room temperature and the entire panel could be scanned within 300 m.sec. When all the applied voltages were interrupted at once, the milky turbid and optically transparent states were memorized as they were and kept for more than 1 week.

In the matrix-addressed liquid crystal display device of the present invention, a mixed cholesteric phase liquid crystal in which molecular axes are aligned in the direction of the electric field above a threshold level is used, the quick phase transition from a nematic phase to a cholesteric phase is utilized, each row electrode is scanned and, therefore, a high speed scanning is made possible.

As a response can be made with an input signal of a shorter time width, said means can be applied also to a matrix apparatus of a large capacity. The applied voltage is low, the driving signal is of a simple wave form and the display device can be driven directly by an intergrated circuit.

Further, in the present invention, it is possible to correct the memorizing state partially.

It is evident that the matrix-addressed liquid crystal display device of the present invention can be applied to a lightvalve means and photomodulating means.

What is claimed is:

1. Apparatus for writing storable images into a matrix-addressed image-storing liquid crystal display device, said apparatus comprising the combination of:
   1. a matrix-addressed display section in which an inductively positive cholesteric phase liquid crystal is contained in a cell formed with a pair of optically transparent plates having on one surface of each a plurality of parallel strip electrodes, said electrodes on at least one of said plates being transparent, and opposed to each other through a spacer with the electrodes mutually intersecting at right angles so as to form row and column electrode groups, the inner surfaces of said plates being subjected to a treatment of vertical orientation so as to render liquid crystal molecules adjacent said surfaces vertical with respect to said surfaces, and said cholesteric phase liquid crystal having its molecules adjacent the inner surfaces of the transparent plates arranged vertical to the surfaces by said treatment.
   2. means for applying to all intersections of said row and column electrode groups a voltage above a threshold voltage $V_H$ at which said liquid crystal shifts from the cholesteric phase to a nematic phase so that a transparent state is achieved at all said intersections,
   3. means for sequentially scanning the column electrodes while applying to selected intersections, for displaying the image on the column electrodes being scanned, an effective voltage below the voltage $V_H$ to effect a shift from the nematic phase to the cholesteric phase at such intersections, applying to the other intersections on the column electrodes being scanned an effective voltage not less than said voltage $V_H$ to maintain the transparent state at such intersections, and applying to all intersections of other column electrodes an effective voltage near the voltage $V_H$ to stabilize the existing phase at such intersections, and,
   4. means for simultaneously interrupting all the voltages applied to all intersections so as to store the image within a short time period after completion of said scanning.

2. A method of writing storable images into a matrix-addressed image-storing liquid crystal display device comprising the steps of:
   1. providing a matrix-addressed display section in which an inductively positive cholesteric phase liquid crystal is contained in a cell formed with a pair of optically transparent plates being on one surface of each a plurality of parallel strip electrodes, said electrodes on at least one of said plates being transparent, and opposed to each other through a spacer with the electrodes mutually intersecting at right angles so as to form row and column electrode groups, the inner surfaces of said plates being subjected to a treatment of vertical orientation so as to render liquid crystal molecules adjacent said surfaces vertical with respect to said surfaces, and said cholesteric phase liquid crystal having its molecules adjacent the inner surfaces of the transparent plates arranged vertical to the surfaces by said treatment.
   2. applying to all intersections of said row and column electrode groups a voltage above a threshold voltage $V_H$ at which said liquid crystal shifts from the cholesteric phase to a nematic phase so that a transparent state is achieved at all said intersections, 3. performing after said step (2) a sequential scanning of the column electrodes while the effective voltage applied to selected intersections for displaying the image on the column electrodes being scanned is below the voltage $V_H$ to effect a shift from the nematic phase to the cholesteric phase at such intersections, the effective voltage applied to the other intersections on the column electrodes being scanned is not less than said voltage $V_H$ to maintain the transparent state at such intersections, and the effective voltage applied to all intersections of other column electrodes is near the voltage $V_H$ to stabilize the existing phase at such intersections, and, 4. after completion of said scanning, simultaneously interrupting all the voltages applied to all intersections so as to store the image within a short time period.

3. The method as defined in claim 1 wherein said cholesteric phase liquid crystal comprises a mixed liquid crystal of an inductively negative nematic substance in which the molecules are oriented vertical to the transparent plate surfaces due to the vertical orientation treatment and an inductively positive cholesteric substance, and from 3 to 5 weight % of a cholesteric substance mixed with said mixed liquid crystal.

4. The method as defined in claim 1 wherein said cholesteric phase liquid crystal comprises an inductively positive nematic substance in which the molecules are oriented vertical to the transparent plate surfaces due to the vertical orientation treatment and from 3 to 50 weight % of a cholesteric substance mixed with said nematic substance.

5. The method as defined in claim 1 wherein said sequential scanning of the column electrodes is performed while applying a voltage - V applied to the column electrodes being scanned, applying a 0 voltage to the other column electrodes, applying a voltage - V to row electrodes forming said selected intersections with the column electrodes being scanned, and applying a voltage + V to the other row electrodes, wherein the voltage V is DC voltage near the threshold voltage $V_H$.

6. The method according to claim 1 wherein said sequential scanning of the column electrodes is performed while applying a voltage V(o) to the column electrodes being scanned, applying a 0 voltage to the other column electrodes, applying a voltage V(o) to the row electrodes forming said selected intersections with the column electrodes being scanned, and applying a voltage V($\pi$) to the other row electrodes, wherein said voltages V(o) and V($\pi$) are AC voltages with values near the threshold voltage $V_H$ and deviating in phase by $\pi$.

7. The method as defined in claim 1 wherein said sequential scanning of the column electrodes is performed while the effective voltage applied to the selected intersections on the column electrodes being scanned is below the voltage at which the nematic to cholesteric phase transition occurs, the effective voltage applied to intersections on the other column electrodes being scanned is above said voltage $V_H$, the effective voltage applied to intersections on column electrodes other than those being scanned in a plurality of adjacent column electrodes including the ones being scanned is below the voltage $V_H$, and the effective voltage applied to column electrodes other than said plurality of adjacent column electrodes including the ones being scanned is near the voltage $V_H$.

* * * * *